(No Model.)
A. BRIGGS.
FRICTION DRUM.
No. 327,516. Patented Oct. 6, 1885.
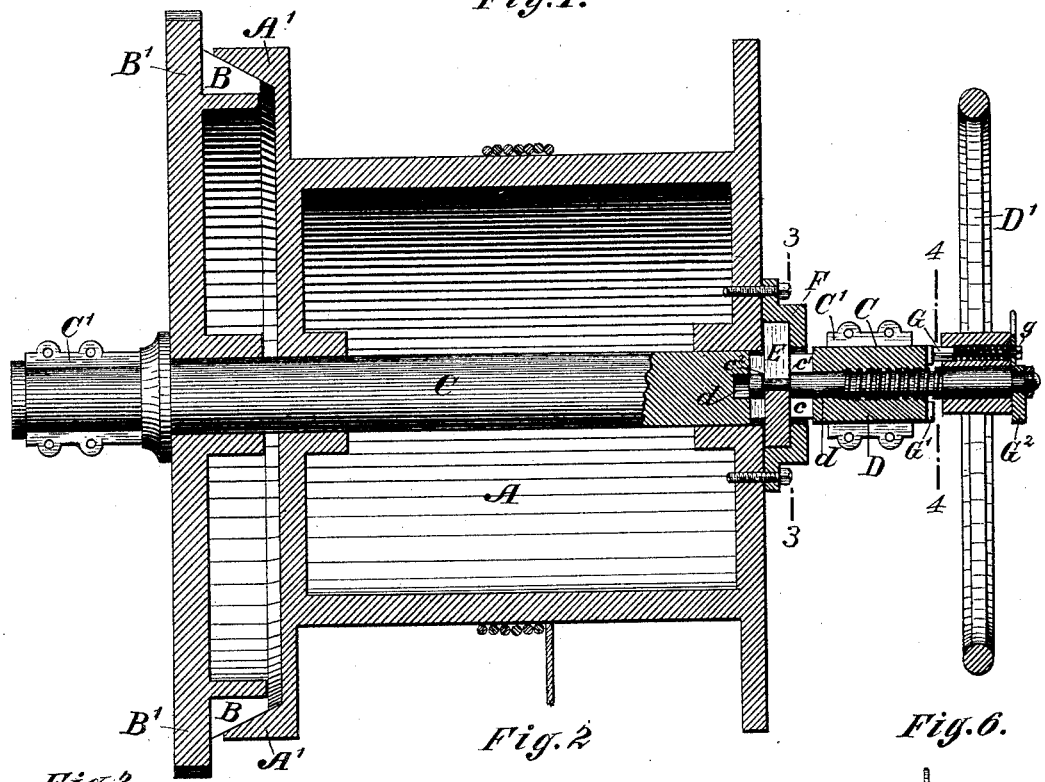
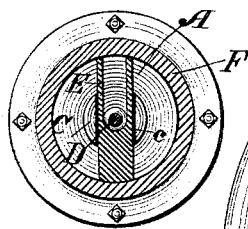
Witnesses:
Chas. S. Baur
Harold P. Brown.
Inventor:
Alfred Briggs
by Munday, Evarts & Adcock
his attys.

UNITED STATES PATENT OFFICE.

ALFRED BRIGGS, OF OTTUMWA, IOWA, ASSIGNOR TO JAMES T. HACKWORTH, ALLEN JOHNSTON, WILL T. MAJOR, AND ALBERT G. HARROW, OF SAME PLACE.

FRICTION-DRUM.

SPECIFICATION forming part of Letters Patent No. 327,516, dated October 6, 1885.

Application filed May 12, 1885. Serial No. 165,196. (No model.)

*To all whom it may concern:*

Be it known that I, ALFRED BRIGGS, a citizen of the United States, residing in Ottumwa, in the county of Wapello and State of Iowa, have invented a new and useful Improvement in Friction-Drums, of which the following is a specification.

To the present construction of sliding friction-drums, of which fair illustrations may be found in the patents to Knowlson, Reissue No. 9,806, July 19, 1881, and Mundy, No. 158,967, January 19, 1875, there are serious objections. In the first place, the device by which the end-thrust upon the drum is exerted when the latter is to be tightened upon its opposing cone does not also effect the withdrawal of the drum when the frictional contact is no longer desired; but the separation is usually effected by a spring tending to force the drum away from the cone, (and which spring must be overcome each time the friction is effected,) or the parts are left to free themselves, aided, perhaps, by their natural tendency to separate when the drum is slowed or quickened by the rope, so as to give it a different speed from that of the cone. Neither of these ways can be depended upon to bring about the separation of the parts. In the next place, in the old construction the end-thrust, which comes from a screw held by a stationary nut extraneous to the drum-shaft, is ultimately transmitted to and must be borne by the bearings of the drum-shaft, causing injurious friction upon them. In the third place, the pins whereby the pressure is transmitted from the tightening-screw to the drum quickly wear out under the great pressure upon them, and the friction between the screws which do not rotate and the parts operated upon by them which do rotate is so much lost power. To obviate all these evils is the object of this invention, which consists in the construction and combinations of parts, hereinafter set forth, whereby the end-thrust is caused to exert a tensile strain upon the shaft instead of causing friction upon the shaft-bearings, the screw becomes capable of use in drawing the drum away from the cone, and the wear and friction adverted to are prevented.

In the drawings, Figure 1 is a central longitudinal section of the friction-drum of a hoisting-machine embodying my invention. Fig. 2 is a face view of the screw-operating hand-wheel and the cam for releasing the pawl which locks the screw against rotation. Figs. 3 and 4 are sectional views upon the lines 3 3 and 4 4, respectively, of Fig. 1. Figs. 5 and 6 are detail views of the pawl-cam.

In said drawings, A represents the winding-drum of a hoisting or other machine, having a flaring flange, A', at one end adapted to set over and frictionally engage with the cone B upon the gear B'. Through this gear B' power from the drum is transmitted to the parts to be actuated. The gear is fast upon shaft C, while the drum is loose thereon. C' C' are the shaft boxes or bearings.

D is the screw for moving the drum to and from the cone, carrying a hand-wheel, D'. It works in a partially-threaded recess, $d$, formed in the end of shaft C, as clearly illustrated, instead of in a nut supported upon a stationary part of the machine, as in the old machines. It will thus be seen that being held in the recess in the shaft it must rotate with the shaft, whatever the direction of the rotation. The pushing power of the screw is transmitted to the drum through the plate E, one end of which is slotted to permit it to be placed astride the unthreaded extension of screw, and the extremities of which bear against the drum. At the point where this plate is located a slot, $c$, is cut in the shaft C, so that the plate may pass centrally through. At each side of plate E the screw is provided with shoulders $c'$ $c^2$, formed by turning down that part immediately under the plate, which shoulders act upon the plate to force it in one direction or the other, according to the direction in which the screw is turned.

It will be seen from what has already been said that if the screw be moved toward the drum the latter will be moved by shoulder $c'$ and plate E into engagement with cone B, and that in so doing the thrust is borne entirely by the shaft, the bearings of the latter being unaffected and the strain becoming simply a tensile one upon the shaft; also, that there will be no wear upon the screw except such as is caused by its own movements in the engaging-thread.

In order to separate the drum and cone positively, when that is desired, so that the drum may immediately be stopped or revolved independently of the cone, I provide the screw with the shoulder $c^2$, and inclose the ends of plate E by an annular flanged collar, F, secured to the drum. With this construction it necessarily results that the back movement of the screw brings with it the plate E and the drum, thereby rendering certain the stoppage of the contact between the cone and drum. The collar F also acts to confine plate E and prevent its slipping out.

To lock the screw, both in the tightened and loose positions, so it may not turn in the threaded recess in the shaft, except when desired, I insert in the hub of wheel D' a spring-pawl, G, which sets into the recesses of a face-ratchet, G', formed upon or attached to the end of shaft C, as shown. This pawl may be drawn out of engagement, whenever the screw is to be changed, by any suitable device—as, for instance, the slotted cam $G^2$, mounted at the hub of wheel D', and having a limited rotation, the pawl projecting through the slot of the cam, and having a nut, $g$, riding on the inclined face thereof.

I claim—

1. The winding-drum loose upon the shaft, so as to permit it to rotate independently thereof and to slide thereon, the cone-gear fast upon the shaft, the plate E, a collar confining said plate, and the screw and its threaded recess, all borne by and combined with said shaft, substantially as specified.

2. In combination with the drum and cone, a screw having shoulders $c'$ $c^2$, plate E, flanged collar F, and the slotted shaft C, having the screw-threaded recess and carrying all said parts, whereby the drum is adapted to be moved both ways with the screw, substantially as set forth.

3. In combination with the drum and cone, a screw having shoulder $c^2$, plate E, flanged collar F, secured to the drum, and the slotted shaft C, having the screw-threaded recess and carrying all said parts, whereby the drum is moved away from the cone, substantially as specified.

4. In combination with the tightening-screw connected to and operating the friction-drum and working in a threaded recess in the drum-shaft, a lock for said screw to hold it against undesired movement in its recess, said lock being also mounted upon said drum-shaft, substantially as specified.

5. In combination with the shaft C, the tightening-screw, and the threaded recess in said shaft, the locking-pawl carried upon the screw, and the ratchet, all borne and rotating with the shaft, substantially as specified.

ALFRED BRIGGS.

Witnesses:
GEO. F. HALL,
J. CHAMBERS, Jr.